Aug. 31, 1948.　　　F. L. DODGE　　　2,448,423
COLLET SEAL
Filed Sept. 14, 1945　　　　　　　　　2 Sheets—Sheet 1
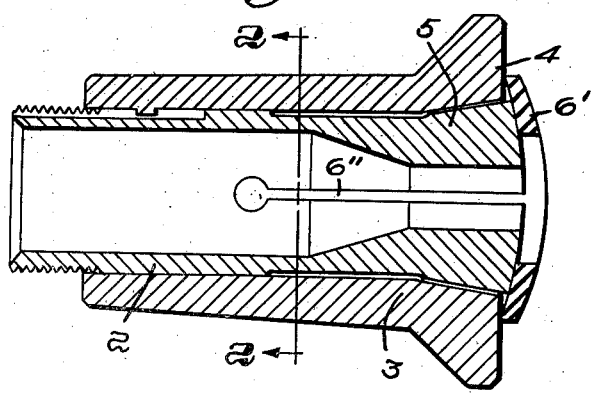
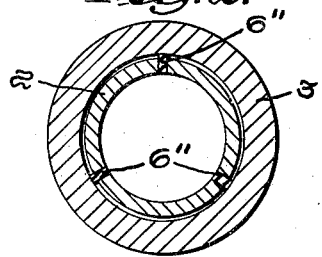
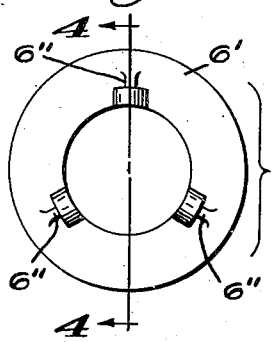
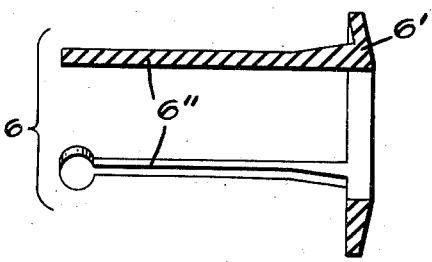
Inventor:
Floyd L. Dodge,
by J. H. McCrady,
Attorney.

Aug. 31, 1948.　　　　　F. L. DODGE　　　　　2,448,423
COLLET SEAL
Filed Sept. 14, 1945　　　　　　　　　　　2 Sheets-Sheet 2
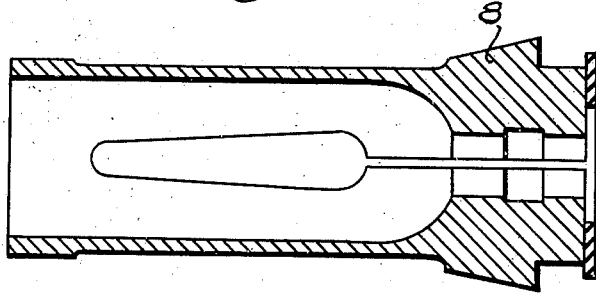
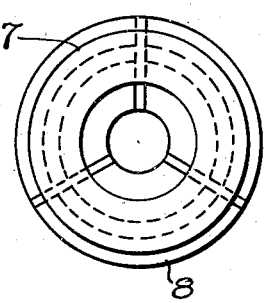
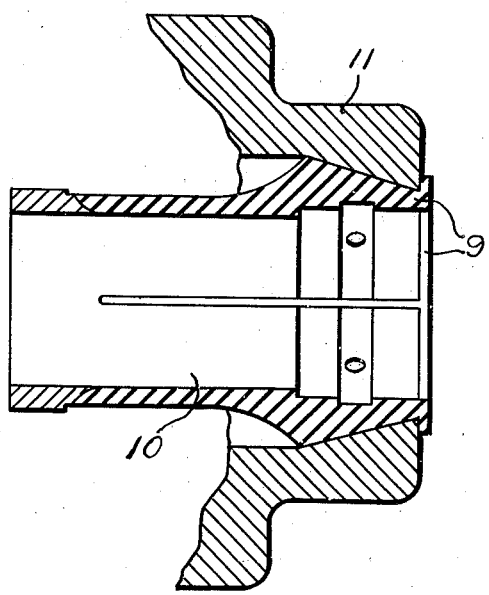
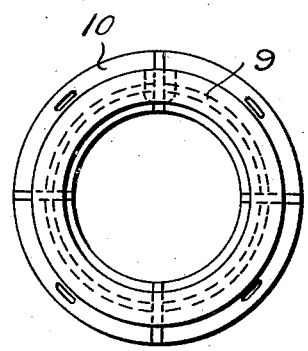
Inventor:
Floyd L. Dodge,
by J. H. McCurdy,
Attorney.

Patented Aug. 31, 1948

2,448,423

UNITED STATES PATENT OFFICE 2,448,423

COLLET SEAL

Floyd L. Dodge, Waltham, Mass., assignor to The Wade Tool Co., Waltham, Mass., a partnership composed of W. Stanley Wade and Emily Wade, both of Weston, Mass.

Application September 14, 1945, Serial No. 616,210

3 Claims. (Cl. 279—51)

This invention relates to collets of the type used in lathes and some other machine tools.

A typical construction comprises a hollow spindle mounted to revolve in the machine head and a collet positioned in the forward end portion of said spindle, the collet being radially slotted to give it elasticity, and both the collet and the spindle having cooperating tapered surfaces so designed that, upon relative movement of these parts axially in one direction the collet will be clamped upon the work, whereas, upon a reverse movement, the collet will expand and release the work. In some designs the collet is pulled inwardly by a hollow drawbar to which it is connected in order to clamp the work, while in other constructions the clamping operation is performed by pushing the collet forwardly. In still another common construction, a sleeve is interposed between the collet and the spindle or forms part of the spindle structure, and is slideable axially to effect the clamping and release of the work.

In the practical operation of machines in which these collet structures are included, much difficulty is experienced with the working of metal filings, chips, and the like, through the slots of the collet into contact with the cooperating tapered surfaces of the collet and spindle. Any such metal parts so positioned introduce inaccuracies in the work, and they are highly objectionable for this reason. While this fact has long been recognized, and many constructions have been devised for the purpose of obviating this difficulty, no entirely satisfactory remedy for it has been devised, so far as I have been able to learn. The present invention is primarily concerned with this problem, and it aims to devise a thoroughly practical solution for it.

The nature of the invention will be readily understood from the following description when read in connection with the accompanying drawings, and the novel features will be particularly pointed out in the appended claims.

In the drawings,

Fig. 1 is a longitudinal, sectional view of a collet having a seal embodying this invention operatively associated therewith;

Fig. 2 is a sectional view, taken substantially on the line 2—2, Fig. 1;

Fig. 3 is a rear end elevation of the collet seal per se;

Fig. 4 is a sectional view of the collet taken on the line 4—4, Fig. 3;

Fig. 5 is a longitudinal, sectional view of a collet of the Brown and Sharp type equipped with a seal embodying this invention;

Fig. 6 is a front view of the collet and its seal, shown in Fig. 5;

Fig. 7 is a longitudinal, sectional view of a Gisholt master collet equipped with a seal embodying this invention; and Fig. 8 is a front elevation of the collet shown in Fig. 7 and the seal therefor.

Referring first to Figs. 1 to 4, inclusive, a collet of the type put out by the Wade Tool Company is there shown at 2 mounted in a spindle nose 3. This collet includes a hollow body, slotted radially to give it elasticity, and provided with a threaded rearward end to be connected with the usual hollow drawbar. Near its forward end it is provided with the usual externally tapered surface 4 to cooperate with a correspondingly internally tapered surface 5 in the spindle nose 3, so that upon rearward movement of this collet in the spindle, its yielding fingers will be clamped upon a rod, or other piece of work, extending through the bore of the collet.

The construction so far described is like that in common commercial use. However, when this device is in operation, metal particles or chips frequently find their way into the interior of the collet. Often they are initially formed in some preceding operation and are thrown off from the work piece against the inner surface of the collet after the chucking of the work. If they work into the space between the cooperating friction surfaces of the collet 2 and the spindle 3, then the troubles above described are produced. This is particularly true if they get on to either of the tapered surfaces 4 or 5.

The present invention substantially eliminates this difficulty by providing the collet with an elastic sealing member, indicated in general at 6 in Figs. 3 and 4. It comprises a head 6' of annular disk-like form and legs 6'' extending rearwardly from said head and molded integral with it. The head overlies both the outer margin of the end face of the collet 2 and also the adjacent marginal portion of the spindle nose so that it closes the circular joint between these parts, while the legs extend, respectively, into the slots in the collet and substantially fill them.

Because these legs are of elastic material, they do not interfere with the normal operation of the collet, but they do substantially close the slots and therefore prevent metal chips and other foreign materials from working through them to the outer surface of the collet where they would cause the troubles above described.

The seal 6 may be made of rubber, either natural or synthetic, or of certain other elastic materials, such as Koroseal, Vinylite and others. Of these materials, those which are highly resistant to the action of lubricants are preferred because of these characteristics. Neoprene, Thiokol and Koroseal, and some others, meet these requirements very satisfactorily. The installation of the sealing member in a collet will be obvious simply from the nature of the parts themselves.

Figs. 5 and 6 show a similar sealing member 7 applied to a collet 8 of the Brown and Sharp type, while Figs. 7 and 8 show another sealing member 9 of a form suitable for use with the Gisholt master collet indicated at 10. Both the latter collets are well known in the machine tool trade, and the sealing members 8 and 9 cooperate with them to accomplish the same result above described in connection with the Wade collet 2. A portion of the spindle nose cooperating with the collet 10 is indicated at 11.

From the foregoing it will be evident that sealing members embodying this invention can be used with a number of different collets of other constructions with which the trade is familiar but which are not here illustrated. Consequently, while I have herein shown and described typical embodiments of my invention, it will be evident that the invention is not limited to embodiment in the particular forms shown.

Such a collet seal, however, is of very substantial practical advantage in eliminating inaccuracies due to the presence of metal particles between the collet and the spindle nose and in confining the chips to the inside of the collet and the draw-bar. In addition, the seal assists in opening the collet to free it for the passage of the stock or work piece into or through it, and it permits the use of a lubricant between the spindle and the collet, thus minimizing wear of either of these members. A further advantage, from the standpoint of the workman, is that when the work is being chucked with the spindle revolving at high speeds, as frequently is the case, the end or head portion of the seal protects the workmen's hands from being nicked by contact with the edges of the slots. For this reason the end or head of the sealing member may be made to cover a larger portion of the end surface of the collet than as shown in the drawings.

Having thus described my invention, what I desire to claim as new is:

1. A collet sealing member comprising a head portion to bear against the outer end face of a collet around the bore thereof, and a plurality of legs integral with said head and extending rearwardly therefrom and constructed to lie in the radial slots of the collet and to close said slots for a substantial distance backwardly from their outer ends.

2. A collet sealing member according to preceding claim 1, in which said legs are provided with enlargements at their inner ends to fit into widened portions of said slots in the collet.

3. A collet sealing member according to preceding claim 1, in which said head portion is of annular disk-like form and is larger in extreme diameter than the end face of the collet with which it is to be used so that it will overlap the marginal surface of the spindle nose adjacent to the end of the collet.

FLOYD L. DODGE.

REFERENCES CITED

The following references are of record in the file of this patent:

UNITED STATES PATENTS

| Number | Name | Date |
|---|---|---|
| 2,211,344 | Montgomery | Aug. 13, 1940 |

FOREIGN PATENTS

| Number | Country | Date |
|---|---|---|
| 482,766 | Great Britain | Apr. 5, 1938 |